United States Patent [19]

Pinto

[11] 4,127,036
[45] Nov. 28, 1978

[54] ENGINE HAVING ALTERNATELY ROTATING ORBITAL PISTONS AND CYLINDERS

[76] Inventor: Adolf P. Pinto, 1807 Hunt Ave., Richland, Wash. 99352

[21] Appl. No.: 828,340

[22] Filed: Aug. 29, 1977

Related U.S. Application Data

[63] Continuation-in-part of Ser. No. 684,156, May 7, 1977, Pat. No. 4,057,039.

[51] Int. Cl.$^2$ ............................................. F16H 21/16
[52] U.S. Cl. ................................... 74/25; 123/197 C
[58] Field of Search ..... 123/197 C, 197 AC, 197 AB, 123/197 R, 52 A; 74/25, 42

[56] References Cited

U.S. PATENT DOCUMENTS

| | | | |
|---|---|---|---|
| 673,137 | 4/1901 | Lamb | 123/197 R |
| 1,406,319 | 2/1922 | Wygodsky | 92/75 |
| 1,876,506 | 9/1932 | Lee | 123/197 R |
| 3,114,355 | 12/1963 | Moo | 123/197 C |
| 3,991,736 | 11/1976 | Spellman | 123/197 C |

*Primary Examiner*—Benjamin W. Wyche
*Assistant Examiner*—Wesley S. Ratliff, Jr.

*Attorney, Agent, or Firm*—Chernoff & Vilhauer

[57] ABSTRACT

An engine having valve means, timing means, fuel distribution means and ignition means configured for operation on a combustible mixture of fuel and air, or other energy source, comprises at least one annular cylinder and mating annular piston forming combustion chambers at both ends and configured for orbital rotation about a central crank. Escapement means transfers orbital rotation of the piston and cylinder in a first direction to the crank and prevents their rotation in the opposite direction relative to a grounded frame which encloses the engine. The piston and cylinder alternately are rotated in the first direction by expansion or contraction of the energy source in successively predetermined combustion chambers on each stroke to rotate the crank. In another embodiment of the engine the cylinders are fixed with the pistons reciprocating therein, and alternate cylinders are reversed in pairs so that the piston rods associated with mating pairs of cylinders can be commonly attached to a coupling means which transmits reciprocative motion through escapement means alternately to one of two friction discs each of which alternately drives an oppositely rotatable shaft.

2 Claims, 16 Drawing Figures

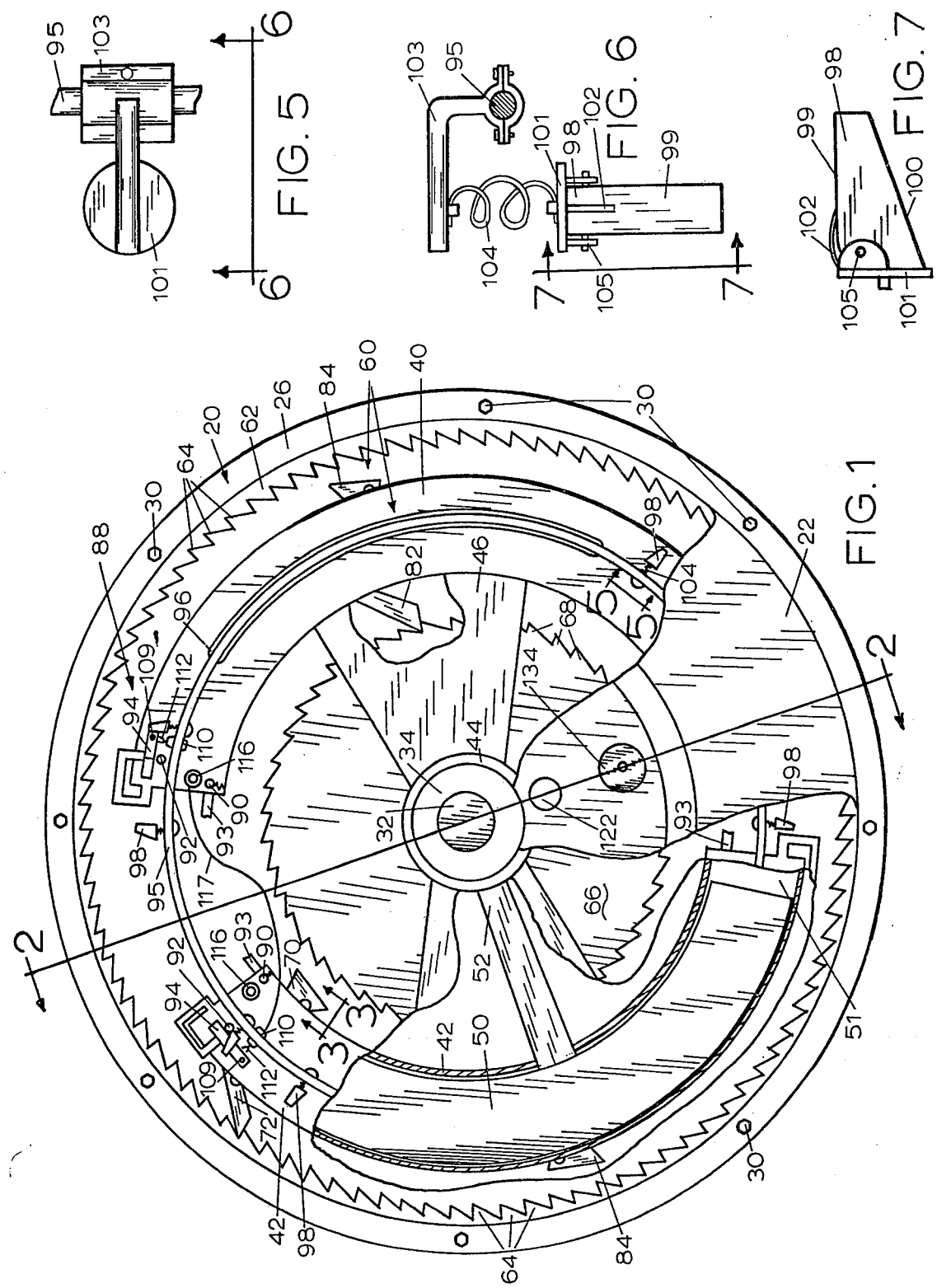

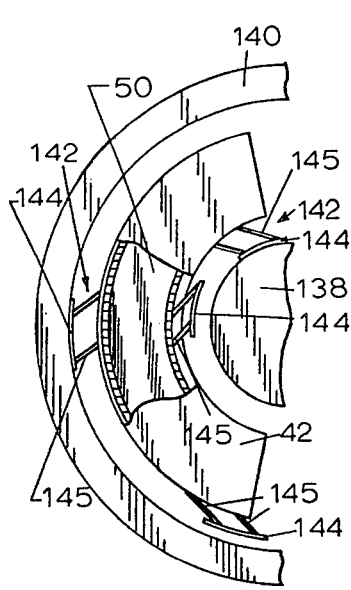
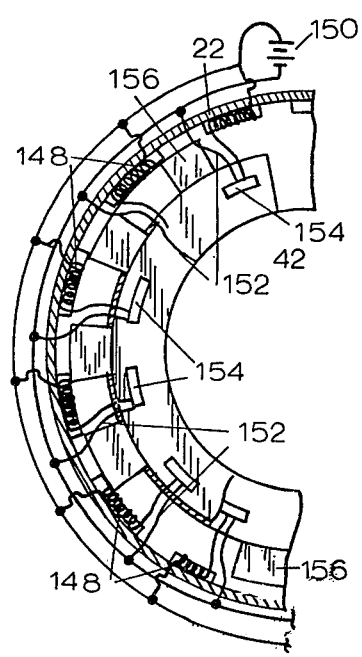
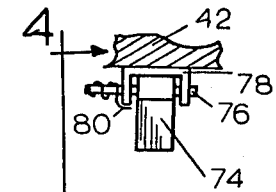
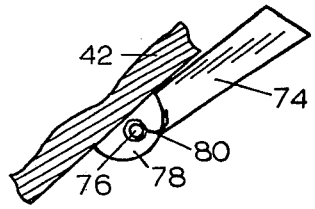
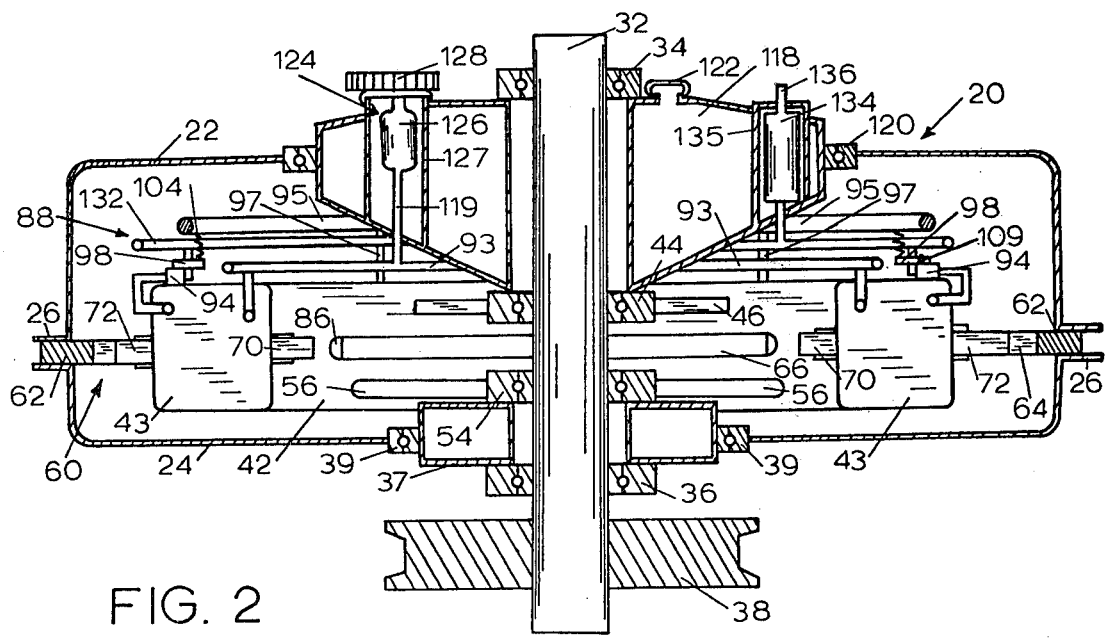

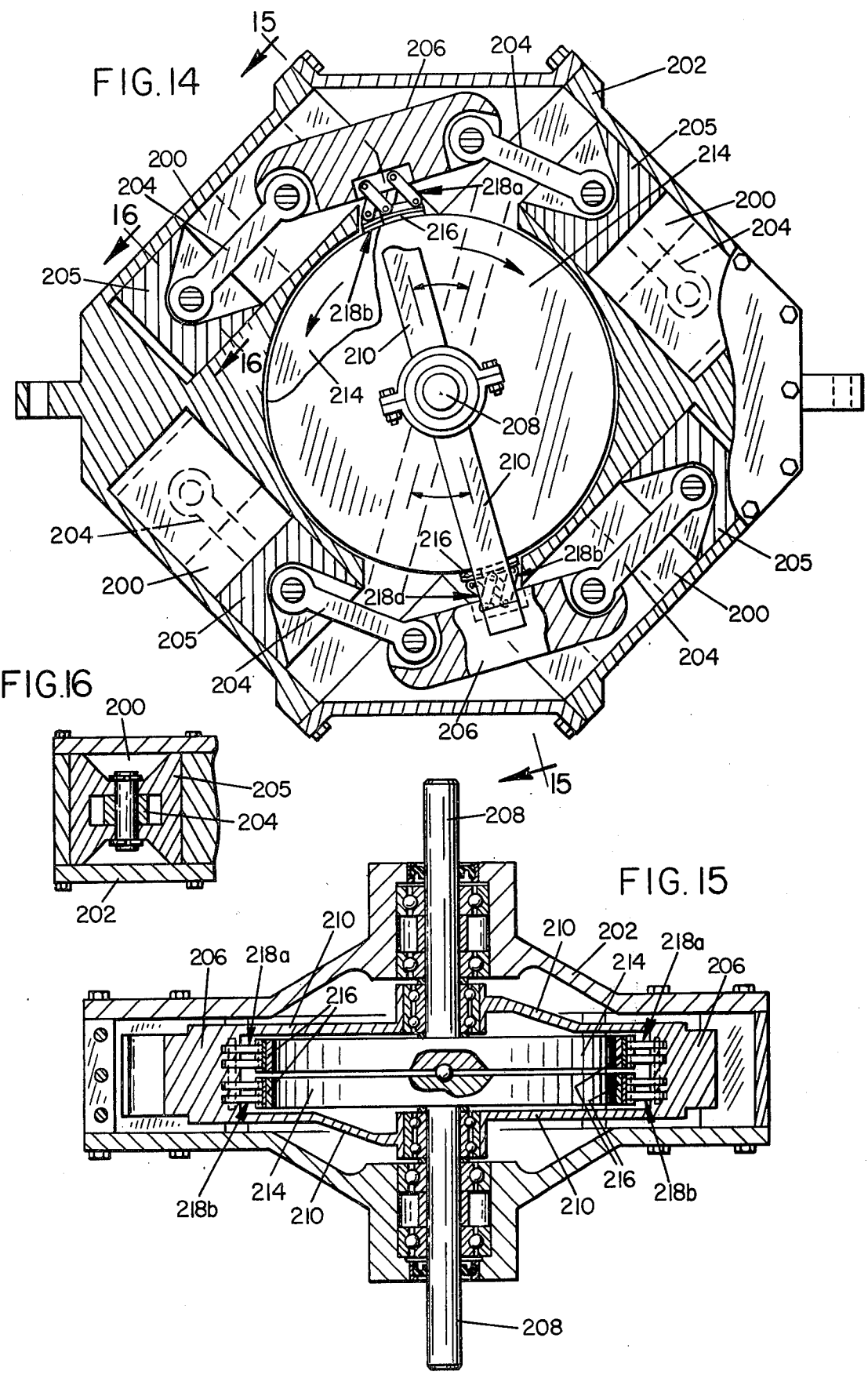

ENGINE HAVING ALTERNATELY ROTATING ORBITAL PISTONS AND CYLINDERS

CROSS-REFERENCE TO OTHER APPLICATIONS

This is a continuation-in-part of application Ser. No. 684,156, filed May 7, 1977, now U.S. Pat. No. 4,057,039.

BACKGROUND OF THE INVENTION

This invention relates in general to a rotary engine, and in particular to such an engine having orbitally mounted pistons and mating cylinders for alternately transmitting energy to central cranks.

With the steadily decreasing availability of energy cources, particularly liquid hydrocarbon fuels such as gasoline, it has become increasingly desirable to develop small, low powered, low speed internal combustion engines which are efficient. Rotary engines have been used frequently in the past for this purpose since maximum torque is delivered to the crank during the entire firing portion of their operating cycle. Rotary engines have been used as a replacement for reciprocating internal combustion engines, which, due to the eccentric connection of the connecting rod to the crank, provide low torque at the initiation of the stroke when the crank presents little lever arm to the connecting rod.

The prior art rotary engines generally combine an irregularly shaped rotor rotatably enclosed in a mating housing which defines several isolated combustion chambers. Since these rotors are of the continuous rotation type, they are difficult to seal against loss of combustion gases, thus causing excess emissions of unburned hydrocarbons. In addition the seals are subject to unsymmetrical loading causing rapid water necessitating frequent, expensive replacement.

Accordingly, it is the general purpose of the present invention to provide a rotary engine utilizing enclosed cylinders having mating sealed pistons which are disposed around a central crank and which transmit force to the crank through a lever arm having a length which is independent of piston displacement, by means of connecting rods which remain normal to the applied force at all times.

It is a further purpose of the present invention to provide such an engine having simple, low cost valve means and valve timing means configured for positive operation.

It is a further purpose of the present invention to provide a positive escapement means in such an engine imparting rotary movement of the piston and cylinder in a predetermined direction to central cranks and preventing the movement of the cranks in the opposite direction.

BRIEF DESCRIPTION OF THE DRAWINGS

The manner in which the foregoing and other objects of the invention are accomplished will be apparent from the accompanying specification and claims, considered together with the drawings wherein:

FIG. 1 is a plan view of the herein described engine, partially broken away to show concealed construction;

FIG. 2 is a cross sectional view in side elevation taken on line 2—2 of FIG. 1;

FIG. 3 is a cross sectional view taken on the line 3—3 of FIG. 1;

FIG. 4 is a cross sectional view taken on the line 4—4 of FIG. 3;

FIG. 5 is a fragmentary plan view taken on the line 5—5 of FIG. 1 and rotated 90°;

FIG. 6 is an end elevational view taken on the line 6—6 of FIG. 5;

FIG. 7 is a fragmentary side elevational view taken on the line 7—7 of FIG. 6;

FIG. 12 is a diagrammatic, fragmentary plan view showing another embodiment of the escapement means which is an element of the invention;

FIG. 13 is a diagrammatic, fragmentary plan view of another embodiment of the escapement means of the invention;

FIG. 14 is a plan view, similar to that in FIG. 1, of another embodiment of the engine partially broken away to show concealed construction;

FIG. 15 is a sectional view in side elevation taken on the line 15—15 of FIG. 14; and FIG. 16 is a sectional view taken on the line 16—16 of FIG. 14.

GENERAL STATEMENT OF THE INVENTION

Figures 8, 9:
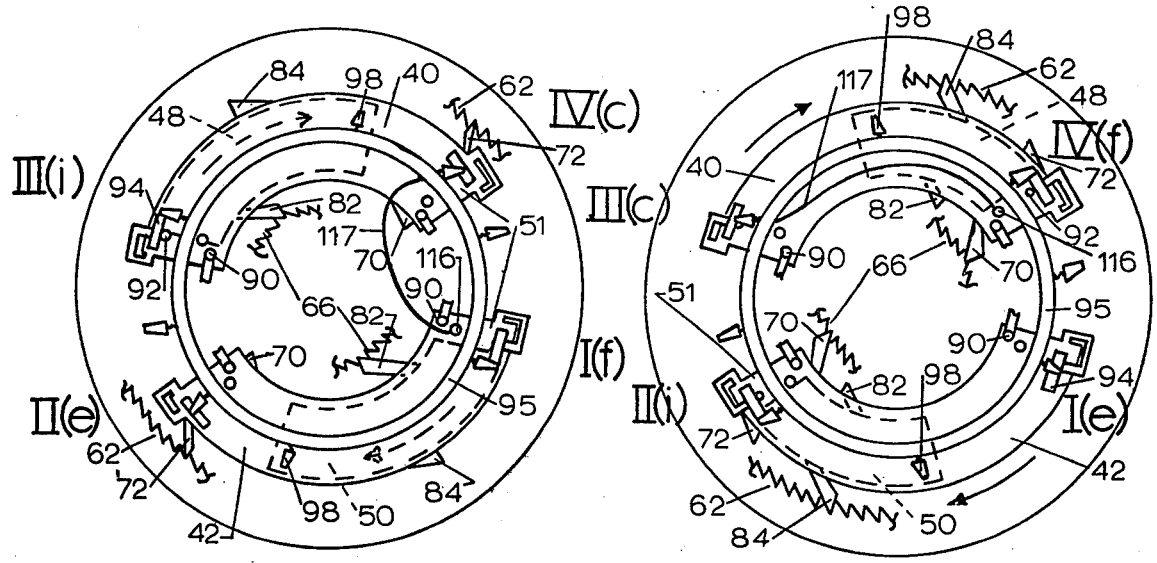
FIGS. 8-11 are diagrammatic plan views of the operative elements of the engine showing its sequence of operation.
Figures 10, 11:
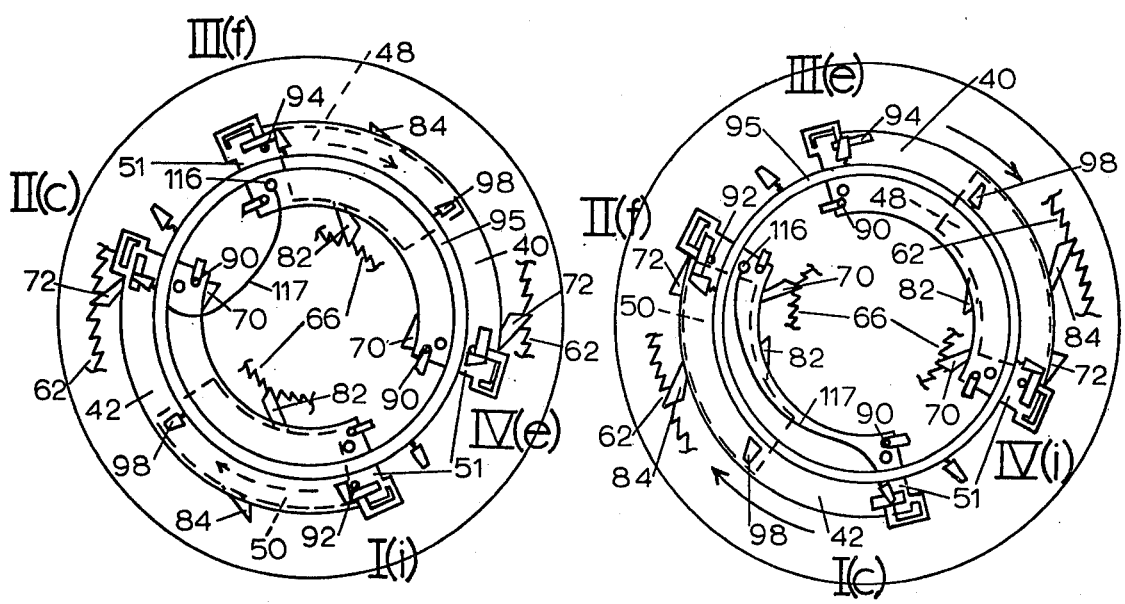

The engine of the present invention broadly comprises peripheral cylinders having mating pistons configured for reciprocal movement therein. In one embodiment both the pistons and cylinders are configured for orbital rotation about a central crank, and in a second embodiment the cylinders are fixed and the pistons reciprocate therein. In both embodiments escapement means transfers the respective movement of these elements intermittently in a selective manner so that continuous rotation is imparted to one or more crank shafts which output from the engine.

DETAILED DESCRIPTION OF THE PREFERRED EMBODIMENTS

Referring to FIGS. 1 and 2 of the drawings, a first embodiment of the engine of the present invention includes a frame 20 which supports and encloses the operative elements of the engine. The frame includes an upper portion 22 and a lower portion 24, each comprising a cylindrical side wall with an integrally joined flat circular end. Outwardly facing mating annular flanges 26 attached to the inner ends of the side walls contain spaced bolt holes. Bolts 30 pass through the holes to join the frame portions together thus forming an enclosed cavity. In the embodiment illustrated in FIGS. 1 and 2 the side wall of the lower portion of the frame is shorter than the side wall of the upper portion. The frame is not rotational during operation of the engine and must be attached by mounting means (not shown) to a rigid support.

Crank 32 is journaled rotatably medially in the frame by means of upper bearing 34 and lower bearing 36. In the embodiment illustrated in FIGS. 1 and 2 the crank comprises a short shaft having a length sufficient to allow its extension beyond the frame for mounting power transmission means, such as a flywheel or drive pulley 38. An oil pan 37 interconnects lower bearing 36 and a frame bearing 39 which is attached to the lower portion 24 of the frame.

In the embodiment illustrated in FIGS. 1 and 2 the engine is shown for use in a four-stroke cycle wherein a first arcuate cylinder 40 and a second arcuate cylinder 42 having closed ends 43 are mounted rotatably to the crank by means of cylinder bearing 44. A planar connecting rod 46 interconnects the bearing and each of the cylinders and locates the cylinders oppositely one another in the frame. In the embodiment illustrated in FIGS. 1 and 2 each cylinder defines a circular arc, shown as being approximately 140°, and is fixed angularly relative to the other cylinder, either by the connecting rod or other appropriate means. The cylinders are illustrated as having rectangular cross sections for ease of machining in their fabrication. However, a circular or any other convenient cross section would serve as well.

A first piston 48 and a second piston 50 fit within the first and second cylinders, respectively. They are arcuate similarly to the cylinders and have rectangular cross sections configured for snug sliding fits within the cylinders. Compression rings (not shown) may be located at each end of the pistons to seal them further within the cylinders. The pistons are shorter than the cylinders, in the preferred embodiment having an arc of approximately 70°. Thus a chamber 51 is formed at each end of both cylinders. The difference between the arc of the pistons and the cylinders, along with the cross sectional area of the cylinders, determine the displacement of the engine.

The pistons are positioned for reciprocation within the cylinders by means of piston rods 52 which are connected freely through openings located medially in the inside peripheral surfaces of the pistons. Thus, when the piston rods thermally expand upon operation of the engine they will pass further into the openings and not displace the pistons relative to the cylinders. However, by forming a tight fit between each opening and the associated piston rod, piston motion will be transmitted without undue sloppiness. The other ends of the piston rods are joined rotatably to the crank by means of piston bearing 54. The piston bearing also carries the top portion of the oil pan 37. Piston slots 56 are located in the radially inner surfaces of the cylinder allowing passage of the piston rods therethrough. The length of the piston slots should be sufficient to permit the pistons to travel to both extremities of their cylinders.

Escapement means 60 transfers movement of the pistons and cylinders in a first direction, illustrated in the drawings as being clockwise, to the crank and prevents movement of the pistons and cylinders in the opposite, or counterclockwise, direction relative to the frame. In the first embodiment of the escapement means, best illustrated in FIG. 1, an outer ratchet ring 62 is attached to the frame to prevent the counterclockwise rotation. The ring has an outer diameter equal to the outside diameter of flanges 26 of the frame and is secured between the upper and lower portions of the frame by means of bolts 30. The inner periphery of the ring includes a plurality of ratchet teeth 64 configured to allow passage of a pawl in a clockwise direction there past and to engage a pawl which is moving counterclockwise. The inner diameter of the outer ratchet ring is such that teeth 64 are located near the outer peripheral surfaces of cylinders 40 and 42.

An inner ratchet ring 66 is attached at its inner portion to crank 32. The outer portion of the ring includes a plurality of ratchet teeth 68 similar to the teeth 64 on the outer ring except that they are reversed. Thus the inner ratchet ring which is always moving in a clockwise direction, being fixed to the crank, will not engage pawls traveling in a clockwise direction at a slower speed. However, it will engage pawls trying to travel in a clockwise direction at a higher speed, thereby imparting torque to the crank. The outer diameter of the inner ratchet ring is such that the teeth 68 are located near the inner peripheral surfaces of the cylinders 40 and 42.

The outer and inner ratchet rings are coplanar with each other in respect to lateral displacement along the crank and are offset upwardly of piston rods 52 and downwardly of connecting rods 46 for convenience of fabrication.

Inner cylinder pawls 70 and outer cylinder pawls 72 are located on the inner and outer peripheral surfaces respectively of the clockwise end portions of cylinders 40 and 42. Referring to FIGS. 3 and 4, they comprise pointed arms 74 which are joined pivotally by pins 76 to clevises 78 attached to the cylinders. Springs 80 normally urge the arms inwardly to retracted positions against the surfaces of the cylinders. The springs are weak enough, however, that upon rotary movement of the cylinders centrifugal force overcomes the springs and allows the arms to move outwardly to extended positions at an angle of approximately 45° to the cylinders.

The inner cylinder pawls 70 are joined to the cylinders in a manner such that the pointed portions of their arms face in the direction of clockwise cylinder travel. Thus when clockwise cylinder travel is initiated the pawls are urged inwardly against springs 80 to engage the inner ratchet ring 66 and drive the crank. The outer cylinder pawls 72 are joined to the cylinders in a manner such that the pointed portions of their arms face in the direction of counterclockwise cylinder travel. Thus when counterclockwise cylinder travel is initiated the pawls are urged outwardly against springs 80 to engage the outer ratchet ring 62 preventing further counterclockwise rotation of the cylinders.

Inner piston pawls 82 and outer piston pawls 84 are located on the inner and outer peripheral surfaces, respectively, of the pistons intermediate their ends. The piston pawls are constructed identically to the cylinder pawls. They pass freely through pawl slots 86 located on the inner and outer peripheral surface of the cylinders in order to contact the respective ratchet rings. The inner slot 86 could coincide with slot 56 if it is made wide enough.

The inner piston pawls 82 are joined to the pistons in a manner such that the pointed portions of their arms face in the direction of clockwise piston travel. Thus when clockwise piston travel is initiated the pawls are urged outwardly against springs 80 to engage the inner ratchet ring 66 and drive the crank clockwise. The outer piston pawls 84 are joined to the piston in a manner such that the pointed portions of their arms face in the direction of counterclockwise piston travel. Thus when counterclockwise piston travel is initiated, the pawls are urged outwardly against springs 80 to engage the outer ratchet ring 62 preventing further counterclockwise rotation of the piston.

A first alternate escapement means is shown in FIG. 12. In this embodiment an inner friction ring 138 and outer friction ring 140 replace the inner and outer ratchet rings, respectively. Movable friction plates 142 comprising rectangular pads 144 with high coefficient of friction outer surfaces each are joined pivotally to the cylinders and pistons by four legs 145. A spring (not shown) normally urges the pads inwardly to retracted positions against the cylinders or pistons. However the springs are weak enough to be overcome by centrifugal force upon rotation of the elements allowing outwardly movement of the friction plates to extended positions in contact with the appropriate friction ring. The friction plates are oriented similarly to the pawls so that clockwise motion of either the pistons or cylinders is transmitted through the inner friction ring to the crank and counterclockwise rotation of the pistons or cylinders is prevented by the outer friction ring.

A second alternative escapement means is shown in FIG. 13. In this embodiment electromagnets 148 are attached at spaced intervals to the inner surface of the frame opposite the cylinders. The magnets are wound in parallel and are activated by an external power source 150. Each electromagnet normally has an open circuit which is closeable through joinder of inwardly facing contacts 152. Contacters 154 are located on the pistons and cylinders at predetermined spaced intervals relative to the electromagnets in a manner to contact the contacts periodically at certain relative rotational positions of rigidly mounted platens 156 relative to the electromagnets. Platens 156 are located on the outer surfaces of the pistons and cylinders at spaced intervals relative to the electromagnets in a manner such that the attraction between the platen and timely energized electromagnet causes the pistons and cylinders to be held against counterclockwise rotation relative to the frame. The gap between the platen and electromagnets should be made as small as possible and the timing for electromagnet energization should be such that the magnet is energized when the platen approaches it and is de-energized once the platen is at its closest point to the magnet.

A similar set of electromagnets, platens and contracters is provided on the crank and inner surfaces of the pistons and cylinders to transfer clockwise rotation of the cylinders and pistons to the crank. These elements are not shown in order to simplify the drawings.

Valve means 88 located at each end of the cylinders comprise intake valves 90 and exhaust valves 92. The intake valves 90 are of the simple one-way check type, opening to allow intake of a fresh charge of air and fuel mixture from intake manifold 93 whenever the pressure in the respective chamber is less than that in the manifold, and closing to retain the mixture in the chamber during compression and firing. The exhaust valves 92, located on top of the cylinders are of the slide type, operable between open and closed positions by translation of slides 94.

The exhaust valves are activated by valve timing means, such as commutator ring 95 connected to the pistons by tabs 97 extending through tab slots 96 located in the upper surfaces of the cylinders. The tab slots have about the same arc length as the piston slots 56 and the pawl slots 86. In the embodiment illustrated paired nubs 98 depend from the ring on both sides of each exhaust valve for engagement with a stem 109 located on each slide 94 to actuate the slide.

Referring to FIGS. 5, 6 and 7 each nub comprises a trapezoidal wedge having a flat contacting surface 99 and a sloped back surface 100. It is joined pivotally to platform 101 by means of hinge 105 and is urged to a position normal to the platform by a weak spring 102 which allows the nub to be easily deflected when its back surface 100 contacts stem 109. The platform is joined to a nub clamp 103 by means of a stiff spring 104. The nub clamp is releasably attached to ring 95. The spring 104 has sufficient side deflection resistance to allow the nub to move the slide when contact surface 99 of the nub contacts stem 109 under normal conditions. However, in the event the slide is prevented from moving, the spring 104 will deflect allowing continued travel of the ring without damage to the nub or valve. The nubs are mounted in pairs on each side of each exhaust valve with their contacting surface 100 facing toward the valve.

Pneumatically operated relays 110 are attached to the top surfaces of the cylinders radially inwardly of each exhaust valve. They have extendable bifurcated prongs 112 which normally are located in a retracted position out of engagement with the slides. However, when one of the relays is activated by application of pneumatic pressure, the prong is extended to engage stem 109 of the adjacent slide, locking that valve in its closed position. A pressure switch 116 located at each of the ends of the cylinders is connected by tubing 117 to a relay 110 located at the next-to-fire chamber 51 to activate the relay to its extended position at the appropriate time in the engine operated sequence.

Ignition means (not shown) are provided at each chamber to ignite the air fuel mixture. A standard automotive type capacitive discharge breaker point timing system may be used to provide short duration high voltage current from a coil to fire spark plugs. Timing may be provided by a timing ring such as that used for the exhaust valve timing. The type of ignition system per-se is not part of the present invention and has been omitted from the drawings in order to simplify the presentation.

In the embodiment illustrated fuel for the engine is stored in an annular fuel tank 118 which is joined at its inner portion to the crank by means of upper bearing 34 and cylinder bearing 44. The fuel tank rotates along with the cylinders to which it is tied by means of a fuel distribution line 119. The outer portion of the tank is joined to the frame by means of fuel tank bearing 120. A removable cap 122 is located on top of the tank allowing for the addition of fuel to the tank.

Fuel distribution means 124 provides a combustible mixture of air and fuel to the intake valves. Carburetor 126 located within a cylindrical enclosure 127 located in the fuel tank, combines atomized fuel with air passed through air filter 128 to a fuel distribution line 119, which in turn is joined to each of the intake valves through intake manifold 93.

Exhaust manifold 132 interconnects the exhaust valves with a muffler 134 located in the fuel tank in an enclosure 135 opposite to the enclosures 127 which house the carburetor. The exhaust then exits through exhaust pipe 136.

OPERATION

The four-stroke operating sequence of the embodiment of the engine just described is shown in FIGS. 8–11 wherein the chambers are numbered I, II, III, IV for convenience.

FIG. 8 shows the engine at completion of firing in chamber II. Chamber I contains a compressed charge of air and fuel, chamber II contains burned combustion gases to be exhausted, chamber III is empty for admission of a fresh charge of air and fuel, and chamber IV contains an uncompressed charge. At this point the pistons are located fully counterclockwise in their respective cylinders. Ring 95 which rotates with the pistons has four nubs 98 with counterclockwise facing contacting surfaces for contacting stem 109 upon counterclockwise rotation of the ring relative to the cylinders. They are positioned relative to the respective exhaust valves in such a manner that each nub 98 has contacted the stem 109 of slide 94 of the respective exhaust valve near the end of the firing stroke in chamber II. The effect was: in chamber I, to attempt to close the exhaust valve that already is in the closed position; in chamber II, to open the exhaust valve; in chamber III, to close the exhaust valve; and in chamber IV, to attempt unsuccessfully to open the exhaust valve. In chamber IV, although the nub 98 contacts the stem 109 of slide 94, it is unable to move the slide and open the valve because the pneumatically actuated prong 112 holds the stem 109 immovably. The prong is actuated by the relay 110 which is energized by the high pressure in chamber I.

During the stroke commencing from the position shown in FIG. 8, chamber I fires, chamber II exhausts, chamber III intakes a fresh charge and chamber IV compresses the charge located in it. As the charge in chamber I expands, it tends to drive the pistons clockwise and the cylinders counterclockwise. Centripetal force urges the inner piston pawls 82 inwardly into engagement with the inner ratchet ring imparting the clockwise piston rotation to the crank. The counterclockwise rotation of the cylinders causes the outer cylinder pawls to move outwardly into engagement with the outer ratchet ring thus preventing their further counterclockwise rotation. As a result the cylinders stay in the same position relative to the frame and the pistons are rotated fully clockwise with respect to the cylinders to the positions shown in FIG. 9.

The ring 95 moves with the pistons to a position relative to the cylinders where the clockwise facing nubs 98 close the exhaust valve at chamber II and open the exhaust valve at chamber I. The exhaust valve at chamber IV was closed and remains so. The raised pressure in chamber IV is transmitted to the pressure switch 116 associated therewith to activate the relay 110 associated with the exhaust valve at chamber III locking the valve in its closed position and deflecting the nub on spring 104. The exhaust valve at chamber III would otherwise have been opened.

In the second stroke chamber IV fires, chamber I exhausts, chamber II intakes a fresh charge and chamber III compresses the charge located in it. Upon firing of chamber IV the resulting expansion tends to drive the pistons counterclockwise and the cylinders clockwise. Centrifugal force resulting from the counterclockwise rotation of the pistons urges the outer piston pawls 84 outwardly into engagement with the outer ratchet ring preventing further counterclockwise piston rotation. The clockwise rotation of the cylinders urges the inner cylinder pawls 70 inwardly engaging the inner ratchet ring to continue clockwise rotation of the crank. As a result, the pistons remain in the same position relative to the frame and the cylinders are rotated clockwise to the position shown in FIG. 10.

Upon cylinder travel the ring 95 moves relative to the cylinders to a position where the counterclockwise facing nubs 98 close the exhaust valve at chamber I and open the exhaust valve at chamber IV. The exhaust valve at chamber III remains in its closed position. The raised pressure in chamber III is transmitted to the pressure switch 116 associated therewith to actuate the relay 110 associated with the exhaust valve at chamber II locking the valve in its closed position and deflecting the nub on spring 104.

The exhaust valve at chamber III would otherwise have been opened.

In the third stroke chamber III fires, chamber IV exhausts, chamber I intakes a fresh charge, and chamber II compressed the charge in it. Upon firing of chamber III the resulting expansion tends to drive the pistons clockwise and the cylinders counterclockwise. Centrifugal force resulting from the counterclockwise rotation of the cylinders urges the outer cylinder pawls outwardly into engagement with the outer ratchet rings preventing further counterclockwise cylinder rotation. The clockwise rotation of the pistons urges the inner piston pawls inwardly engaging the inner ratchet ring continuing clockwise rotation of the crank. As a result, the cylinders remain in the same position relative to the frame and the pistons are rotated clockwise to the position in FIG. 11.

The ring 95 moves with the pistons to a position relative to the cylinder where the clockwise facing nubs 98 close the exhaust valve at chamber IV and open the exhaust valve at chamber III. The exhaust valve at chamber II remains closed. The raised pressure in chamber II is transmitted to the pressure switch 116 associated therewith to activate the relay 110 associated with the exhaust valve at chamber I locking the exhaust valve in its closed position and deflecting the nub on spring 104. Otherwise the exhaust valve at chamber I would have been opened.

In the fourth stroke, chamber II fires, chamber III exhausts, chamber IV intakes a fresh charge, and chamber I compresses the charge in it. Upon firing of chamber II the resulting expansion tends to drive the cylinders clockwise and the pistons counterclockwise. Centrifugal force resulting from the counterclockwise rotation of the pistons urges the outer piston pawls outwardly into engagement with the outer ratchet ring preventing further piston counterclockwise rotation. The clockwise rotation of the cylinders urges the inner cylinder pawls inwardly engaging the inner ratchet ring to continue clockwise rotation of the crank. As a result, the pistons remain in the same position relative to the frame and the cylinders are rotated clockwise to the relative position shown in FIG. 8. Thus a full cycle has been completed and the engine is in a position to repeat its cycle. It will be noted that only two cylinders are shown in the preferred embodiment. This is the minimum number for the four-stroke cycle operation described. However, additional sets of two could be attached to the crank in a like manner to provide a larger engine.

It will be noted also that the basic concept of the engine is not limited to the four-stroke cycle. The invention may easily be adapted by changing the valve means, timing means and ignition means to operate on a stirling cycle or as a steam engine. In addition a single cylinder and piston may be utilized for two stroke cycle operation.

The operation of alternate escapement means is obvious from their description, and provides results similar to the above. Detailed description of their operations would do little except legthen the specification and so are omitted.

A second embodiment of the invention, shown in FIGS. 14, 15 and 16, utilizes straight cylinders 200, rather than annular ones, which are fixed to frame 202 rather than being rotatable. The cylinders are located tangential to a cylindrical plane and are arranged in pairs with the open ends of the cylinders in each pair facing one another. Accordingly the piston rods 204 associated with the pistons 205 in each pair extend toward each other where they are joined to coupling means, such as block 206. Block 206 is rotatably mounted to paired coaxial shafts 208 by means of connecting rods 210. The shafts in turn are rotatably journaled in the frame 202 to which cylinders 200 are fixed. Thus the pistons in each pair are arranged for reciprocative movement in their associated cylinders simultaneously in opposite synchronization, with block 206 moving therewith. The valve means, ignition means, fuel distribution means and exhaust are not shown in this embodiment for ease of illustration, however, they are similar to that described above except that the fuel tank need not be rotatably mounted since the cylinders are fixed.

Shafts 208 are located centrally in the cylindrical plane about which cylinders 200 are located and have inner ends which are located adjacent to one another medial of the coupling means. Joined perpendicularly to the inner end of each shaft is a thin cylindrical friction disc 214 having a frictional surface 216 located about its periphery arranged to interact with friction plates 218 similar to plates 142 shown in FIG. 12 and described above.

The friction plates comprise first friction plates 218a which are peripherally attached to each of the coupling means coplanar with friction surface 216 of one of the friction discs and second friction plates 218b which are pivotally attached to each coupling means coplanar with the friction surface of the other friction disc. However, the respective friction plates are reversed so that if the first friction plates are activated by clockwise rotation of the connecting means for example, the second friction plates are activated by their counterclockwise rotation.

Accordingly when one piston in a pair is forced outwardly in its respective cylinder, due to firing of an explosive charge of fuel therein, one of the friction discs, and thus its associated shaft, is rotated in one direction, and when the other piston in the pair is fired, the other friction disc, and thus its associated shaft, is rotated in the opposite direction. When more than one set of pistons and cylinders are used the friction plates are located such that each of the respective friction discs always is rotated in only one direction.

The above-described operation is for four cycle operation which requires the joining of both connecting rods 210. However two cycle operation is possible in this embodiment of the engine also by changing the valve and ignition means and by journaling the connecting rods for each cylinder block 206 independently.

Operational details of the engine, such as starting means, lubrication means and an ignition system have not been included for simplicity of presentation. Conventional systems known in the prior art can readily be adapted to the particular requirements of the present engine to serve these functions.

Having thus described my invention in preferred embodiments, what I claim is:

1. An engine comprising:
   (a) a frame;
   (b) paired coaxial shafts independently rotatably journaled in said frame;
   (c) at least one pair of open-ended cylinders connected to said frame, said cylinders being located tangential to a cylindrical plane which encircles said central shafts, the cylinders in each pair being arranged in a manner such that their open ends are located adjacent to and face one another;
   (d) a piston and piston rod associated with each of said cylinders, said piston configured for reciprocative travel in its respective cylinder;
   (e) coupling means interconnecting the piston rods of each pair of pistons;
   (f) a connecting rod attached to said coupling means and rotatably journaled to at least one of said shafts; and
   (g) escapement means associated with each of said coupling means, said escapement means configured to automatically, selectively, intermittently interengage said coupling means with said shafts in a manner such that each one of said shafts is rotated in a single direction upon reciprocation of the pistons in their associated cylinders.

2. The engine of claim 1 wherein the paired shafts have inner ends located adjacent to one another substantially medial of said coupling means and the escapement means comprises:
   (a) a thin cylindrical friction disc connected to the inner end of each of said shafts substantially perpendicular thereto, each of said friction discs having a frictional surface located about its periphery;
   (b) first friction plates pivotally attached to the outer peripheral surface of each of said coupling means coplanar with one of said friction discs, said first friction plates having pads with high friction surfaces, and being configured for engagement with said one of said friction discs when counterclockwise rotation of said coupling means is initiated thereby translating said counterclockwise rotation to the associated shaft, and for disengagement upon clockwise rotation of said coupling means; and
   (c) second friction plates pivotally attached to the outer peripheral surface of each of said coupling means coplanar with the other of said friction discs, said second friction plates having pads with high friction surfaces, and being configured for engagement with said other of said friction discs when clockwise rotation of the other of said coupling means is initiated thereby transmitting said clockwise rotation to the associated shaft, and for disengagement upon counterclockwise rotation of said coupling means.

* * * * *